US008407160B2

(12) United States Patent
Cretu et al.

(10) Patent No.: US 8,407,160 B2
(45) Date of Patent: Mar. 26, 2013

(54) SYSTEMS, METHODS, AND MEDIA FOR GENERATING SANITIZED DATA, SANITIZING ANOMALY DETECTION MODELS, AND/OR GENERATING SANITIZED ANOMALY DETECTION MODELS

(75) Inventors: Gabriela Cretu, New York, NY (US); Angelos Stavrou, New York, NY (US); Salvatore J. Stolfo, Ridgewood, NJ (US); Angelos D. Keromytis, New York, NY (US); Michael E. Locasto, Miller, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 463 days.

(21) Appl. No.: 11/940,790

(22) Filed: Nov. 15, 2007

(65) Prior Publication Data
US 2008/0262985 A1 Oct. 23, 2008

Related U.S. Application Data

(60) Provisional application No. 60/859,040, filed on Nov. 15, 2006, provisional application No. 60/987,135, filed on Nov. 12, 2007.

(51) Int. Cl.
*G06F 15/18* (2006.01)
(52) U.S. Cl. ........................................... 706/12
(58) Field of Classification Search .................. None
See application file for complete search history.

(56) References Cited

U.S. PATENT DOCUMENTS

| | | | | |
|---|---|---|---|---|
| 5,842,002 A | * | 11/1998 | Schnurer et al. | 703/21 |
| 6,898,469 B2 | * | 5/2005 | Bickford | 700/30 |
| 7,519,563 B1 | * | 4/2009 | Urmanov et al. | 706/12 |
| 7,832,012 B2 | * | 11/2010 | Huddleston | 726/24 |
| 2008/0177680 A1 | * | 7/2008 | Laxman et al. | 706/12 |
| 2009/0030864 A1 | * | 1/2009 | Pednault et al. | 706/45 |

OTHER PUBLICATIONS

Eskin et al.; "A Geometric Framework for Unsupervised Anomaly Detection: Detecting Intrusions in Unlabeled Data"; 2002; Applications of Data Mining in Computer Security.*
A. Somayaji and S. Forrest. "Automated Response Using System-Call Delays." In Proceedings of the 9th USENIX Security Symposium, Aug. 2000.
B. Parmanto, M. P. W., and H. R. Doyle "Improving Comittee Diagnosis with Resampling Techniques," Advances in Neural Information Processing Systems, vol. 8 pp. 882-888, 1996.
C. Kreugel, T. Toth, and E. Kirda. "Service Specific Anomaly Detection for Network Intrusion Detection." In Proceedings of the ACM Symposium on Applied Computing (SAC), 2002.

(Continued)

*Primary Examiner* — David R Vincent
*Assistant Examiner* — Stanley K Hill
(74) *Attorney, Agent, or Firm* — Byrne Poh LLP

(57) ABSTRACT

Systems, methods, and media for generating sanitized data, sanitizing anomaly detection models, and generating anomaly detection models are provided. In some embodiments, methods for generating sanitized data are provided. The methods including: dividing a first training dataset comprised of a plurality of training data items into a plurality of data subsets each including at least one training data item of the plurality of training data items of the first training dataset; based on the plurality of data subsets, generating a plurality of distinct anomaly detection micro-models; testing at least one data item of the plurality of data items of a second training dataset of training data items against each of the plurality of micro-models to produce a score for the at least one tested data item; and generating at least one output dataset based on the score for the at least one tested data item.

17 Claims, 6 Drawing Sheets

OTHER PUBLICATIONS

C. Taylor and C. Gates. "Challenging the Anomaly Detection Paradign: A Provocative Discussion," in Proceeding of the 15th New Security Paradigns Workshop (NSPW), Sep. 2006, pp. 21-29.

Crandall, J.R., Su, Z., Wu, S.F., and Chonng, F.T. "On Deriving Unknown Vulnerabilities from Zero-Day Polymorphic and Meta morphic Worm Exploits." In Proceedings of the 12th ACM Conference on Computer and Communication Security (CCS).

D. Wagner and P. Soto, "Mimicry Attacks on Host-based Intrusion Detection Systems", Proceedings of the 9th ACM Conference on Computer and Communications Security, Washington, DC, 2002.

D. Wolpert, "Stacked Generalization" in Neural Networks, vol. 5. 1992, pp. 241-259.

E. M. Knorr and R.. T. Ng. "Algorithms for mining distance-based outliers in large datasets," in 24th International Conference on Very Large Data Bases, 1998.

G. F. Cretu, A. Stavrou, S. J. Stolfo, and A. D. Keromytis. "Data Sanitization: Improving the Forensic Utility of Anomaly Detection Systems," in Workshop on Hot Topics in System Dependability (HotDep), 2007.

H. Patil and C. N. Fischer, "Efficient Turn Time Monitoring Using Shadow Processing," in Proceeding of the 2nd International Workshop on Automated and Algorithmic Debugging, 1995.

J. J. Parekh, "Privacy-Preserving Distributed Event Corooboration," Ph.D dissertation, Columbia University, 2007.

J. McHugh, "Testing Intrusion Detection Systems: A Critique of the 1998 and 1999 DARPA Intrusion Detection System Evaluations as perfromed by Lincoln Laboratory," ACM TISSEC, vol. 3 No. 3 pp. 262-291, 2000.

J. Newsome, B. Karp, and D. Song. "Polygraph: Automatically Generating Signatures for Polymorphic worms." In Proceedings of the IEEE Security & Privacy Symposium, pp. 226-241, May 2005.

K. G. Anagnostakis, S. Sidiroglu, P. Akritidis, K. Xinidis, E. Markatos, and A. D. Keromytis. "Detecting Targeted Attacks Using Shadow Honeypots." In Proceedings of the 14th USENIX Security Symposium, pp. 129-144, Aug. 2005.

K. Wang and S. J. Stolfo. "Anomalous Payload-Based Network Intrusion Detection." In Proceedings of the 7th International Symposium on Recent Advances in Intrusion Detection (RAID), pp. 203-222, Sep. 2004.

K. Wang, G. Cretu and S. J. Stolfo, "Anomalous Payload-based Worm Detection and Signature Generation," Proceedings of Recent Advance in Intrusion Detection, Seattle, Sep. 2005.

K. Wang, Janak J. Parekh, S.J.S. "Anagram: A Content Anomaly Detector Resistant to Mimicry Attack." In Proceedings fo the 9th International Symposium on Recent Advances in Intrustion Detection (RAID), 2006.

L. Breiman, "Bagging Predictors," Maching Learning, vol. 24, No. 2, pp. 123-140, 1996.

M. M. Breunig, H. P. Kriegel, T. T. Ng, and J. Sandor "LOF: Identifying Desity based Local Outliers," in ACM SIGMOD International Conference on Management of Data, 2000.

M. Ramadas, S. Ostermann, and B. Tjaden, "Detecting Anomalous Network Traffic with Self-Organzing Maps," in Sixth International Symposium on Recent Advances in Intrusion Detection, 2003.

P. Fogla and W. Le, "Evading Network Anomaly Detection Systems: Formal Reasoning and Practical Techniques," in Proceedings of the 13th Acm Conference on Computer and Communications Security (CCS), 2006, pp. 59-68.

P. K. Chan and S. J. Stolfo, "Experiments in Multistrategy Learning by Meta-Learning," in Proceedings of the Second International Conference on Information and Knowledge Management, Washington, DC, 1993 pp. 314-323.

R. P. Lippmann and J. Haines, "Analysis and Results of the 1999 DARPA OffLine Intrusion Detection Evalutation," in Proceedings of the Recent Advances in Intrusion Detection (RAID 200), 2000 pp. 162-182.

S. Forrest, A. Somayaji, and D. Ackley, "Building Diverse Computer Systems," In Proceedings of the 6th Workshop on Hot Topics in Operating Systems, pp. 67-72, 1997.

S. Sidiroglou, M. E. Locasto, S. W. Boyd, and A. D. Keromytis, "Building a Reactive Immune System for Software Services." In Proceedings of the USENIX Annual Technical Conference, pp. 149-161, Apr. 2005.

S. Stolfo, W. Fan, W. Lee, A. Prodromidis, and P. Chan, "Cost based Modeling for Fraud and Intrusion Detection: Results from the JAM Project," in Proceedings of the DARPA Information Survability Conference and Exposition (DISCEX), 2000.

T. Detristan, T. T. Ulenspiegel, Y. Malcom and M. S. von Underduk, "Polymorphic Shellcode Engine Using Spectrum Analysis," Phrack, vo. 11, No. 61-9, 2003.

T. G. Dietterich, "Ensemble Methods in Machine Learning" Lecture Notes in Computer Science, col. 1857, pp. 1-15, 2000.

Tan, K.M.C. and R.A Maxion, "Why 6? Defining the Operational Limits of Stide, an Anomaly Based Intrusion Detector," In IEEE Symposium on Security and Privacy, 2002.

W. Robertson, G. Vigna, C. Kruegel, and R. Kemmerer, "Using Generalization and Characterization Techniques in the Anomaly based Detection of Web Attacks" in Network and Distributed System Security Symposiuim, 2006.

Y. Freund and R. E. Schaprire, "A decision-theoretic generalization of on-line learning and an application to boosting," in Eurpoean Conference on Computational learning Theory, 1995, pp. 23-37.

Y. Song, M. E. Locasto, A. Stavrou, A. D. Keromytis, and S. J. Stolfo, "On the infeasibility of modeling polymorphic shellcode," in Proc. of the 14th ACM conference on Computer and Communications Security (CCS), Alexandria, VA, USA, 2007, pp. 541-551.

Anagnostakis, K.G., et al., "Detecting Targeted Attacks Using Shadow Honeypots", In Proceedings of the 14th USENIX Security Symposium (SSYM'05), Baltimore, MD, USA, Jul. 31-Aug. 5, 2005, pp. 129-144.

Breiman, L., "Bagging Predictors", In Maching Learning, vol. 24, No. 2, Aug. 1996, pp. 123-140.

Breunig, M.M., et al., "LOF: Identifying Density-Based Local Outliers", In Proceedings of the 2000 ACM SIGMOD International Conference on Management of Data (SIGMOD '00), vol. 29, No. 2, Dallas, TX, USA, Jun. 2000, pp. 93-104.

Chan, P.K. and Stolfo, S.J., "Experiments in Multistrategy Learning by Meta-Learning", In Proceedings of the Second International Conference on Information and Knowledge Management (CIKM '93), Washington, DC, USA, Nov. 1-5, 1993, pp. 314-323.

Crandall, J.R., et al., "On Deriving Unknown Vulnerabilities from Zero-Day Polymorphic and Metamorphic Worm Exploits", In Proceedings of the 12th ACM Conference on Computer and Communication Security (CCS '05), Nov. 7-11, 2005, Alexandria, VA, USA, pp. 235-248.

Cretu, G.F., et al., "Data Sanitization: Improving the Forensic Utility of Anomaly Detection Systems", In Proceedings of the 3rd Workshop on on Hot Topics in System Dependability (HotDep'07), Edinburgh, UK, Jun. 26, 2007, pp. 1-6.

Detristan, T., et al., "Polymorphic Shellcode Engine Using Spectrum Analysis", In Phrack, vol. 61, Aug. 13, 2003, available at: http://www.phrack.org/issues.html?issue=61&id=9.

Dietterich, T.G., "Ensemble Methods in Machine Learning", In Proceedings of the First International Workshop on Multiple Classifier Systems (MCS'00), Cagliari, IT, Jun. 21-23, 2000, pp. 1-15.

Fogla, P. and Lee, W., "Evading Network Anomaly Detection Systems: Formal Reasoning and Practical Techniques", In Proceedings of the 13th ACM Conference on Computer and Communications Security (CCS '06), Alexandria, VA, USA, Oct. 30-Nov. 3, 2006, pp. 59-68.

Forrest, S., et al., "Building Diverse Computer Systems", In Proceedings of the Sixth Workshop on Hot Topics in Operating Systems, Cape Cod, MA, USA, May 5-6, 1997, pp. 67-72.

Freund, Y. and Schapire, R.E., "A Decision-Theoretic Generalization of On-Line Learning and an Application to Boosting", In Journal of Computer and System Sciences, vol. 55, No. 1, Aug. 1997, pp. 119-139.

Gales, C. and Taylor, C., "Challenging the Anomaly Detection Paradigm: A Provocative Discussion", In Proceedings of the 2006 Workshop on New Security Paradigms (NSPW '06), Schloss Dagstuhl, DE, Sep. 19-22, 2006, pp. 21-29.

Knorr, E.M. and Ng, R.T., "Algorithms for Mining Distance-Based Outliers in Large Datasets", In Proceedings of the 24th International Conference on Very Large Data Bases (VLDB '98), New York City, NY, USA, Aug. 24-27, 1998, pp. 392-403.

Knorr, E.M. and Ng, R.T., "Finding Intensional Knowledge of Distance-Based Outliers", in Proceedings of 25th International Conference on Very Large Data Bases (VLDB'99), Edinburgh, SF, UK, Sep. 7-10, 1999, pp. 211-222.

Krugel, C., et al., "Service Specific Anomaly Detection for Network Intrusion Detection", In Proceedings of the 2002 ACM Symposium on Applied Computing (SAC 2002), Madrid, ES, Mar. 10-14, 2002, pp. 201-208.

Lippmann, R., et al., "Analysis and Results of the 1999 DARPA Off-Line Intrusion Detection Evalutation", In International Symposium on Recent Advances in Intrusion Detection (RAID 2000), Toulouse, FR, Oct. 2-4, 2000, pp. 162-182.

McHugh, J., "Testing Intrusion Detection Systems: A Critique of the 1998 and 1999 DARPA Intrusion Detection System Evaluations as Performed by Lincoln Laboratory", In ACM Transactions on Information and System Security (TISSEC), vol. 3, No. 4, Nov. 2000 pp. 262-294.

Moore, D. and Shannon, C., "The Spread of the Code-Red Worm (CRv2)", Caida.org, Sep. 24, 2007, available at: http://www.caida.org/analysis/security/code-red/coderedv2_analysis.xml.

Newsome, J., et al., "Polygraph: Automatically Generating Signatures for Polymorphic Worms", In IEEE Symposium on Security and Privacy, May 8-11, 2005, pp. 226-241.

Parekh, J.J., "Privacy-Preserving Distributed Event Corroboration", Ph.D Dissertation, Columbia University, 2007.

Parmanto, B., et al., "Improving Committee Diagnosis with Resampling Techniques", In Advances in Neural Information Processing Systems, vol. 8, 1996, pp. 882-888.

Patil, H. and Fischer, C., "Efficient Run-Time Monitoring Using Shadow Processing", In Proceeding of the 2nd International Workshop on Automated and Algorithmic Debugging (AADEBUG'95), Saint-Malo, FR, May 22-24, 1995, pp. 1-14.

Ramadas, M., et al., "Detecting Anomalous Network Traffic with Self-Organizing Maps", In the 6th International Symposium Recent Advances in Intrusion Detection, (RAID 2003), Pittsburgh, PA, USA, Sep. 8-10, 2003, pp. 36-54.

Robertson, W., et al., "Using Generalization and Characterization Techniques in the Anomaly-Based Detection of Web Attacks", In Proceedings of the Network and Distributed System Security Symposium (NDSS 2006), San Diego, CA, USA, 2006.

Sidiroglou, S., et al. "Building a Reactive Immune System for Software Services", In Proceedings of the 2005 USENIX Annual Technical Conference (USENIX 2005), Anaheim, CA, USA, Apr. 10-15, 2005, pp. 149-161.

Somayaji, A., and Forrest, S., "Automated Response Using System-Call Delays", In Proceedings of the 9th Conference on USENIX Security Symposium (SSYM'00), Denver, CO, USA, Aug. 14-17, 2000.

Song, Y., et al., "On the Infeasibility of Modeling Polymorphic Shellcode", In Proceedings of the 14th ACM Conference on Computer and Communications Security (CCS'07), Alexandria, VA, USA, Oct. 29-Nov. 2, 2007, pp. 541-551.

Stolfo, S.J., et al., "Cost-Based Modeling for Fraud and Intrusion Detection: Results from the JAM Project", In Proceedings of the DARPA Information Survivability Conference & Exposition (DISCEX'00), Jan. 25-27, 2000, Hilton Head, SC, USA, pp. 130-144.

Tan, K.M.C. and Maxion, R.A., "Why 6?' Defining the Operational Limits of Stide, and Anomaly-Based Intrusion Detector", In IEEE Symposium on Security and Privacy, Berkeley, CA, USA, May 12-15, 2002, pp. 188-201.

Wagner, D. and Soto, P., "Mimicry Attacks on Host-Based Intrusion Detection Systems", In Proceedings of the Ninth ACM Conference on Computer and Communications Security (CCS 2002), Washington, DC, USA, Nov. 18-22, 2002, pp. 255-264.

Wang, K. and Stolfo, S.J., "Anomalous Payload-Based Network Intrusion Detection", In Proceedings of the 7th International Symposium on Recent Advances in Intrusion Detection (RAID'04), Sep. 2004, pp. 203-222.

Wang, K., et al., "Anagram: A Content Anomaly Detector Resistant to Mimicry Attack", In Proceedings of the International Conference on Recent Advanced in Intrusion Detection (RAID '06), Sep. 2006, pp. 1-20.

Wang, K., et al., "Anomalous Payload-Based Worm Detection and Signature Generation", In Proceedings of the 8th International Symposium on Recent Advances in Intrusion Detection (RAID'05), Sep. 2005, pp. 227-246.

Wolpert, D.H., "Stacked Generalization", In Neural Network, vol. 5., No. 2, 1992, pp. 241-259.

* cited by examiner

SYSTEMS, METHODS, AND MEDIA FOR GENERATING SANITIZED DATA, SANITIZING ANOMALY DETECTION MODELS, AND/OR GENERATING SANITIZED ANOMALY DETECTION MODELS

CROSS-REFERENCE TO RELATED APPLICATION

This application claims the benefit of U.S. Provisional Patent Application No. 60/859,040, filed Nov. 15, 2006, and U.S. Provisional Patent Application No. 60/987,135, filed Nov. 12, 2007, each of which is hereby incorporated by reference herein in its entirety.

STATEMENT REGARDING FEDERALLY SPONSORED RESEARCH OR DEVELOPMENT

This invention was made with government support under Grant No. DAFAFRLFA8750060221 awarded by the Disruptive Technology Office. The government has certain rights in the invention.

TECHNICAL FIELD

The disclosed subject matter relates to systems, methods, and media for generating sanitized data, sanitizing anomaly detection models, and generating anomaly detection models.

BACKGROUND

Models of data can be used to show characteristics of that data. For example, network data traffic models can be used to show unique characteristics of specific network data traffic. Network data traffic models can be used for detecting network data traffic content anomalies, such as malicious code. This is because the characteristics of normal data traffic differ from the characteristics of data traffic harboring malicious code, such as viruses, worms, Trojan horses, spyware, and/or other data that can cause harmful effects. Anomaly-based systems can be used to generate anomaly detection models and/or use anomaly detection models to monitor and detect anomalous code in, for example, network traffic, instruction streams, and/or streams of function calls, etc.

Anomaly-based systems can be used to detect abnormal inputs and/or behavior without relying on, for example, a static set of signatures or a potentially incomplete behavioral specification. The efficacy of anomaly detection sensors can depend, however, on the quality of the data used to train them. Artificial or contrived training datasets may not provide a realistic view of the deployment environment. On the other hand, real world datasets may be dirty, for example, they may contain a number of attacks or abnormal events. However, the size of training data sets can make manual removal or labeling of anomalies difficult and/or impractical. As a result, sensors trained on such data may, for example, miss some attacks and their variations.

SUMMARY

Systems, methods, and media for generating sanitized data, sanitizing anomaly detection models, and generating anomaly detection models are provided. In some embodiments, methods for generating sanitized data are provided. The methods including: dividing a first training dataset comprised of a plurality of training data items into a plurality of data subsets each including at least one training data item of the plurality of training data items of the first training dataset; based on the plurality of data subsets, generating a plurality of distinct anomaly detection micro-models; testing at least one data item of the plurality of data items of a second training dataset of training data items against each of the plurality of micro-models to produce a score for the at least one tested data item; and generating at least one output dataset based on the score for the at least one tested data item. In some embodiments, the methods include removing at least one data item of the plurality of data items from the input training dataset and generating a sanitized anomaly detection model based on the at least one output dataset. In some embodiments, the methods include testing an input dataset using the sanitized anomaly detection model to determine if the input dataset includes anomalies.

In some embodiments, computer-readable media containing computer-executable instructions that, when executed by a processor, cause the processor to perform methods for generating sanitized data are provided. The methods including: dividing a first training dataset comprised of a plurality of training data items into a plurality of data subsets each including at least one training data item of the plurality of training data items of the first training dataset; based on the plurality of data subsets, generating a plurality of distinct anomaly detection micro-models; testing at least one data item of the plurality of data items of a second training dataset of training data items against each of the plurality of micro-models to produce a score for the at least one tested data item; and generating at least one output dataset based on the score for the at least one tested data item.

In some embodiments, systems for generating sanitized data including an interface in communication with a network; a memory; and a processor in communication with the memory and the interface are provided, wherein the processor: divides a first training dataset comprised of a plurality of training data items into a plurality of data subsets each including at least one training data item of the plurality of training data items of the first training dataset; based on the plurality of data subsets, generates a plurality of distinct anomaly detection micro-models; tests at least one data item of the plurality of data items of a second training dataset of training data items against each of the plurality of micro-models to produce a score for the at least one tested data item; and generates at least one output dataset based on the score for the at least one tested data item.

In some embodiments methods for sanitizing anomaly detection models are provided. The methods including receiving at least one abnormal anomaly detection model from at least one remote location; comparing at least one of the at least one abnormal anomaly detection model to a local normal detection model to produce a common set of features common to both the at least one abnormal anomaly detection model and the local normal detection model; and generating a sanitized normal anomaly detection model by removing the common set of features from the local normal detection model.

In some embodiments, computer-readable media containing computer-executable instructions that, when executed by a processor, cause the processor to perform methods for sanitizing anomaly detection models are provided. The methods including receiving at least one abnormal anomaly detection model from at least one remote location; comparing at least one of the at least one abnormal anomaly detection model to a local normal detection model to produce a common set of features common to both the at least one abnormal anomaly detection model and the local normal detection model; and generating a sanitized normal anomaly detection model by removing the common set of features from the local normal detection model.

In some embodiments, methods for sanitizing anomaly detection models are provided. The methods including: receiving at least one abnormal anomaly detection model from at least one remote location; testing at least one data item of a training dataset of data items against at least one of the at least one abnormal anomaly detection model to provide an indication that the at least one data item is abnormal; and creating a sanitized training dataset of data items based on the indication that the at least one data item is abnormal.

In some embodiments, computer-readable media containing computer-executable instructions that, when executed by a processor, cause the processor to perform methods for sanitizing anomaly detection models are provided. The methods including: receiving at least one abnormal anomaly detection model from at least one remote location; testing at least one data item of a training dataset of data items against at least one of the at least one abnormal anomaly detection model to provide an indication that the at least one data item is abnormal; and creating a sanitized training dataset of data items based on the indication that the at least one data item is abnormal.

DETAILED DESCRIPTION

Figure 1:
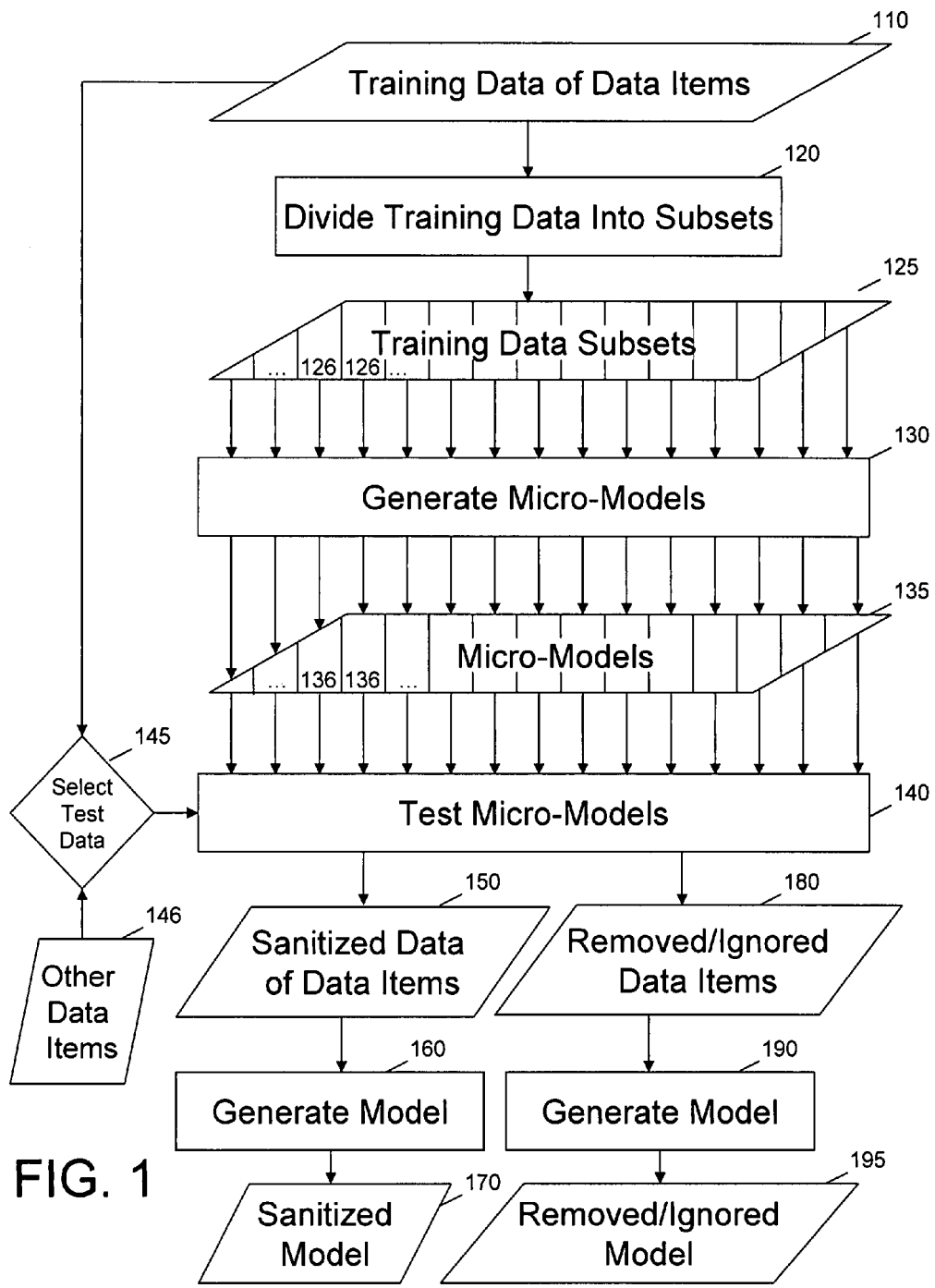
FIG. 1 is simple illustration of a method for generating at least one of a sanitized anomaly detection model and an abnormal anomaly detection model in accordance with some embodiments of the disclosed subject matter.

In some embodiments, systems, methods, and media for generating sanitized data, sanitizing anomaly detection models, and generating anomaly detection models are provided. For example, FIG. 1 illustrates a method for generating a model 170 from a set of training data 110. Training data 110 can be divided, at 120, into subsets 125. Subsets 125 can be used to generate, at 130, micro-models 135. In some embodiments, each training data subset 126 of training data subsets 125 can be used to generate a corresponding micro-model 136 of micro-models 135. Micro-models 135 can be sanitized, at 140, to generate sanitized data 150, by, for example, removing and/or ignoring information related to abnormal data-items that may be present in the training data 110 and training data subsets 125. Sanitizing, at 140, can include, testing the data items of training data 110 and/or other data items 146 against the micro-models 135. Which test-data to use in sanitizing, at 150, can be determined, at 145, and can be based on, for example, whether training data 110 and/or training data subsets 125 are available for sanitizing, at 140. Sanitized data 150 can be used to generate, at 160, a sanitized model, 170. In some embodiments, the data items that were removed and/or ignored, at 140, can be used to generate a data set of removed data items 180. Data set 180 can be used to generate, at 190, a model 195. In some embodiments, model 170 and/or model 195 can be used to detect anomalies. In some embodiments, model 170 can be a model of normal sanitized data and model 195 can be a model of abnormal data.

Training data 110 can include a plurality of training data items, such as, for example, packets, instruction streams, streams of function calls, portions of applications, embedded objects, etc. Training data 110 can also include, for example, a static file of previously collected data and/or a stream of data currently being monitored, at, for example, a network interface, and possibly being saved for future testing and/or analysis. In some embodiments, a training data 110(T) can be divided into a number of smaller subsets $ss_1$-$ss_n$. This can be represented as T={$ss_1$, $ss_2$, ..., $ss_n$} where $ss_i$ is the subset starting at time (i−1)*g, where g is the granularity for each subset. The granularity of T can be defined in terms of, for example, a number of bytes, a number of instructions, a number of function calls, and/or a time period. Various values can be used for T. For example, in some embodiments, each subset 125 can be defined in terms of time with a granularity ranging from 3 to 5 hours and training data 110 can include data items monitored over 500 hours. Anomaly detection micro-models 135 (M), can be generated from a training dataset 110 T, which can be represented as M=AD(T), where AD can include various anomaly detection systems and/or methods. In some embodiments, training data subsets 125 can include all of training data 110 and in other embodiments, subsets 125 can include only a portion of training data 110 (e.g. selected randomly, selected manually, and/or selected based on data type).

Micro-models 135 can be sanitized, at 140, using the training data 110 and/or a second set of training data 146 (e.g., a stream of packets being observed on a network interface after training, at 125, is complete). Sanitizing, at 150, can generate a labeled data set with each training dataset item labeled as, for example, normal or abnormal. For example, labels, $L_{j,i}$ can be assigned based on a test of a training data item j against a micro-model $M_i$, i.e., $L_{j,i}$=TEST($P_j$,$M_i$), where the label $L_{j,i}$ is assigned a value of 0 if the model $M_i$ deems the data item normal or 1 if the model $M_i$ deems it abnormal.

The labels can be generalized by, for example processing a labeled dataset through a voting scheme, which assigns a score to each data item. The scores can represent, for example, various weight that data items are given in considering their contribution toward indicating normal or abnormal behavior. Such a score can be calculated as, for example:

$$\text{SCORE}(P_j) = \frac{1}{W} \sum_{i=1}^{N} w_i \cdot L_{j,i},$$

where $w_i$ is a weight assigned to model $M_i$ and $$W = \sum_{I=1}^{N} w_i.$$

Various voting strategies are possible, for example, all micro-models can be weighted identically or each micro-model can have an assigned weight, $w_i$, based on, for example, the number of data items used to train it and/or the type of data items in each micro-model.

In some cases, micro-models 135 may contain attack-related content. If an abnormal data item related to attack-related content is classified using such a micro-model, or a model including such a micro-model, the abnormal data item may be classified as normal despite being abnormal. In some embodiments, such attack-related content can be removed from the micro-model 135. For example, data items can be removed from the training dataset based on their score. In some embodiments, a set of normal data items, $T_{san}$ 150 and a set of abnormal data items $T_{abn}$, can be created and used to generate a sanitized model $M_{san}$ and an abnormal model $M_{abn}$, using for example, the following equations:

$$T_{san} = \cup \{P_j | SCORE(P_j) \leq V\}, M_{san} = AD(T_{san}); \text{ and}$$

$$T_{abn} = \cup \{P_j | SCORE(P_j) > V\}, M_{abn} = AD(T_{san})$$

where V is a voting threshold. In embodiments where voting is unweighted, V can be the maximum percentage of abnormal labels permitted such that a data item is labeled normal. V can be set to various values between 0 and 1, for example, V may be set to a value between 0.15 and 0.45. Sanitized data items 150 can be used, for example, to generate, at 160, a sanitized anomaly detection model 170. A user and/or system administrator can set V based on, for example, the training set or sets being used, the type of anomaly detection model being used, the granularity, and/or the type of data monitored. V can be chosen to achieve an appropriate balance between detection and false positive rates. For example, V may be chosen to achieve a high detection rate and a low false positive rate. The selection of a value for V can also depend on various values selected in the particular anomaly detection system being used, for example, to generate each micro-model at model 135 and/or to generate a model at 160 and/or 190. For example, some anomaly detection systems have a threshold value which can be set to provide a dividing line between normal behavior and abnormal behavior. In selecting a value for V, a threshold value can be considered and in selecting a threshold value, the value of V can be considered.

Figure 2:
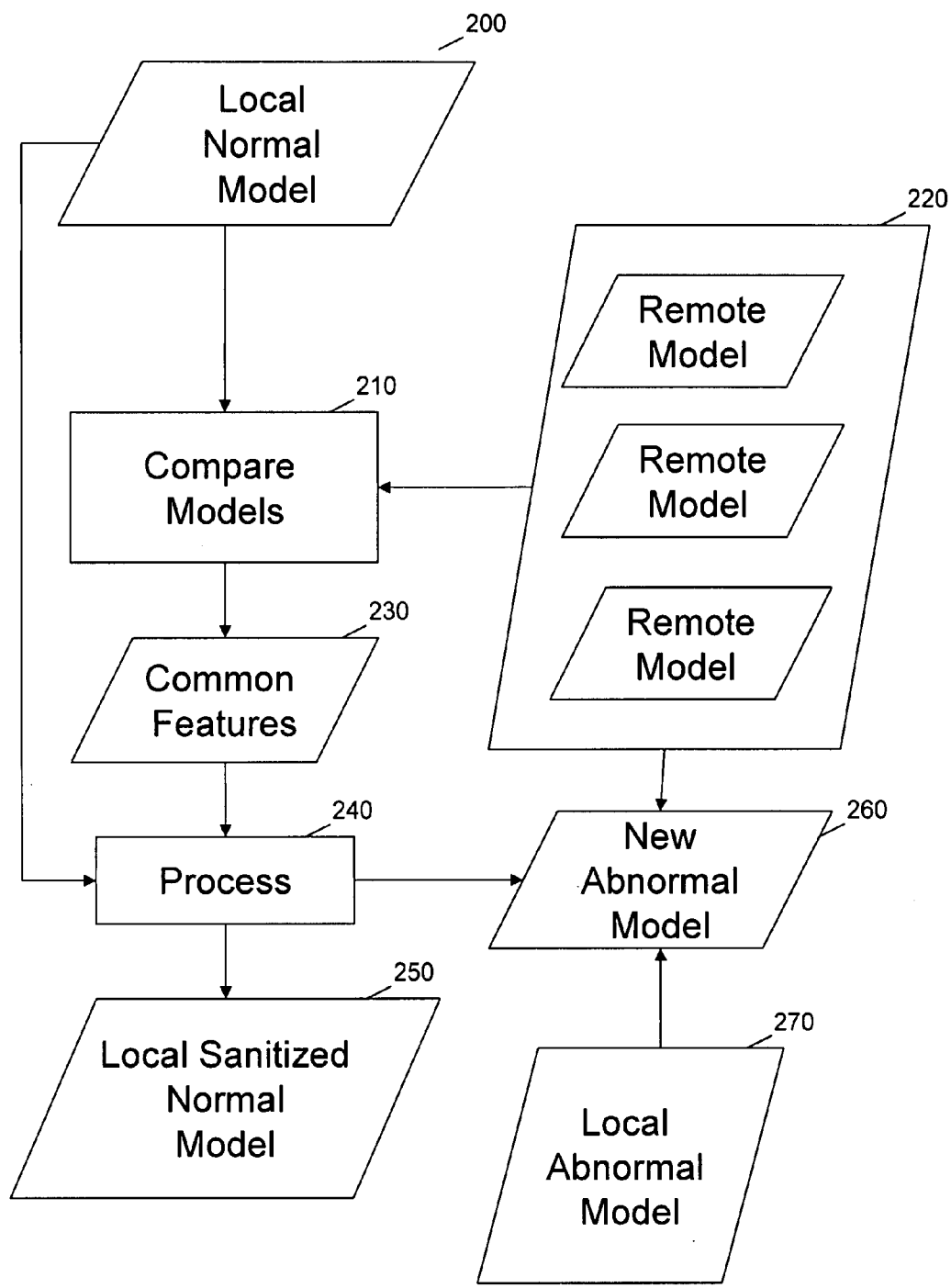
FIG. 2 is a simple illustration of a method for sanitizing a local anomaly detection model using remote anomaly detection models in accordance with some embodiments of the disclosed subject matter.

In some embodiments, systems, methods, and media for sanitizing anomaly detection models by collaborating with various digital processing devices are provided. Various digital processing devices can share various abnormal, normal, and/or sanitized models and compare models to update at least one a local abnormal, normal, and/or sanitized model. In various embodiments, normal models, abnormal models, and/or sanitized models can be separate models (e.g., stored as separate data structures). In various embodiments, normal models, abnormal models, and/or sanitized models can be stored together as one model (e.g., with various portions identified as abnormal or normal). For example, FIG. 2 illustrates a method for sanitizing a local normal anomaly detection model 200 based on remote abnormal anomaly detection models 220 to generate a local sanitized normal anomaly detection model 250. In some embodiments, anomaly detection model 200 can include, for example, anomaly detection model 170 and/or models 220 can include model 195. Model 200 can be compared, at 210, to one or more of models 220 to produce a common set of features 230 common to both model 200 and at least one of models 220. Model 200 can be processed, at 240, to generate a sanitized model 250, that, for example, does not contain content contained in both model 200 and any of models 220. In some embodiments, model 250 can be represented in equation form as: Model 250=Model 200−∪{Models 220∩Model 200}. In some embodiments, a new and/or updated abnormal model 260 can be generated. This model can include, for example, a model of abnormal behavior including models 220 and/or common features 230. Model 250 can also be combined with, for example, a local model of abnormal behavior, such as model 270.

Figure 3:
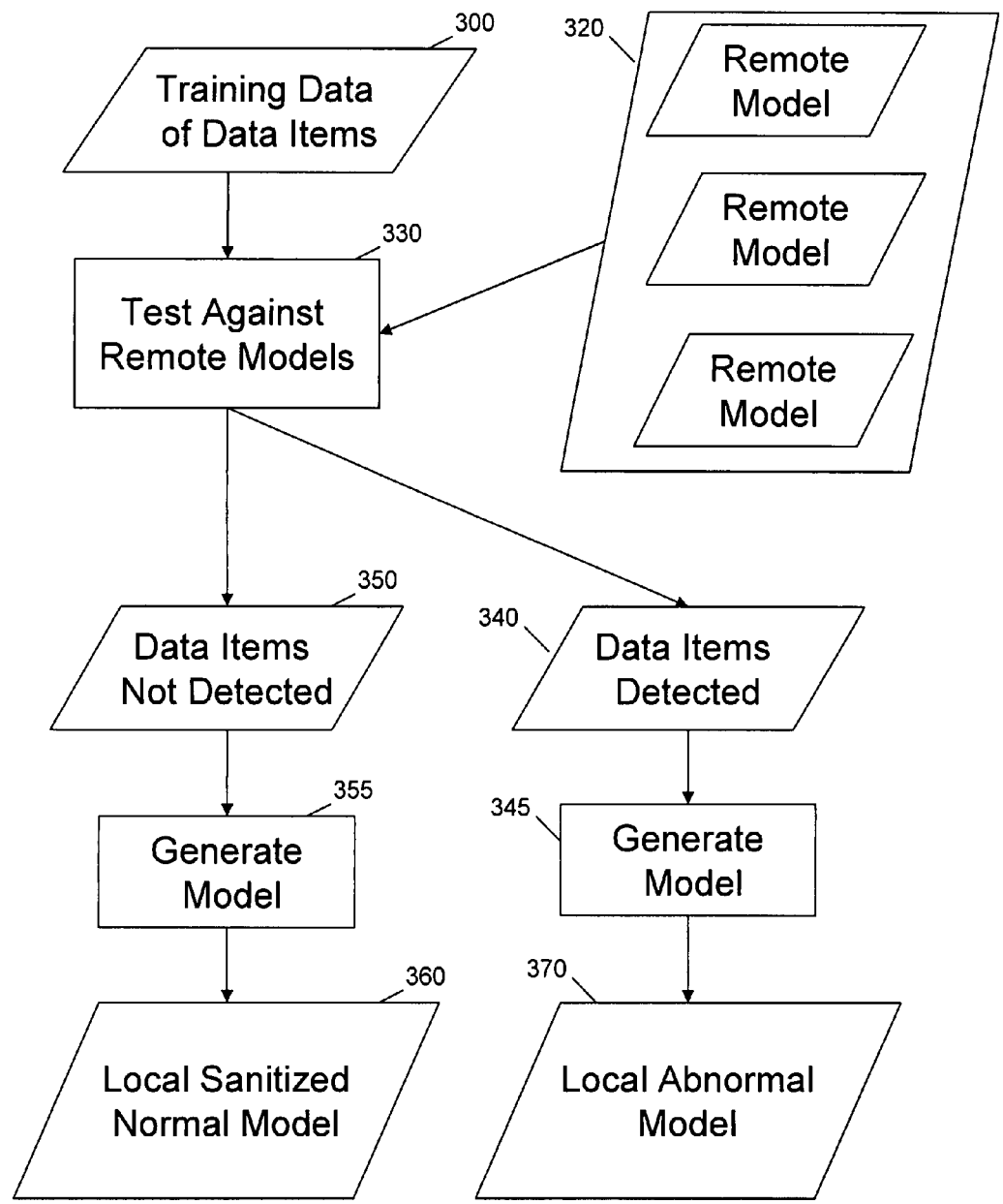
FIG. 3 is a simple illustration of a method for sanitizing a local training data set using remote anomaly detection models and generating at least one of a sanitized anomaly detection model and an abnormal anomaly detection model in accordance with some embodiments of the disclosed subject matter.

In some embodiments, a local model 200 and remote models 220 may not be directly comparable. For example, model 200 may have been generated using a first anomaly detection model generating method and some of models 220 may have been generated using a second anomaly detection model generating method which generates a different type of model than the first method. In some embodiments, a local training data set can be tested against various remote models. Based on this testing, a new local model or models can be generated. The local training data set as well as the remote models can be various combinations of normal models and abnormal models. For example, FIG. 3 illustrates a method for sanitizing a local normal training data set 300 based on remote abnormal detection models 320 to generate a local normal sanitized anomaly detection model 360 and a local abnormal anomaly detection model 370. Data set 300 can be tested, at 330, against remote models 320. If a remote model of the models 320 indicates a hit on a data item (in this case, if a model 320 indicates a data item is anomalous), it can be added to anomalous data set 340. If a remote model of the models 320 does not indicate a hit on a data item (in this case, if a model 320 indicates a data item is normal), it can be added to normal data set 350. Models 360 and 370 can be generated, at 355 and 345, based on their corresponding dataset of datasets 350 or 340.

Figure 4:
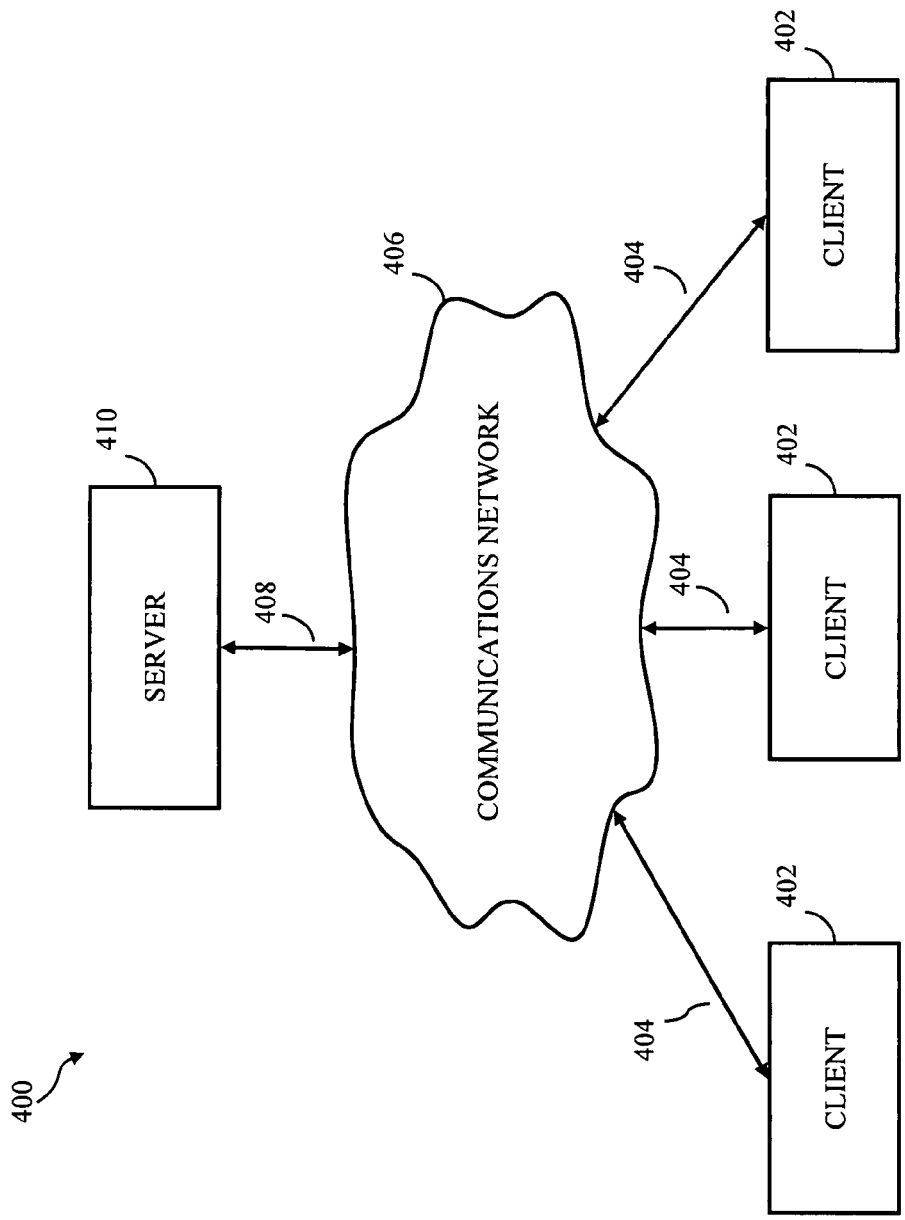
FIG. 4 is a schematic diagram of a system suitable for sanitizing, generating, and/or sharing data sets and/or anomaly detection models in accordance with some embodiments of the disclosed subject matter.

FIG. 4 is a schematic diagram of an illustrative system 400 that can be used for generating sanitized data, sanitizing anomaly detection models, and/or generating anomaly detection models in accordance with some embodiments of the disclosed subject matter. As illustrated, system 400 can include one or more clients 402. Clients 402 can be connected by one or more communications links 404 to a communications network 406 or connected directly to each other. Communications network 406 can also be linked through a communications link 408 to a server 410. Various embodiments of the disclosed subject matter can be implemented on at least one of the server and the clients. It is also possible that a client and a server can be connected through communication links 408 or 404 directly and not through a communication network 406.

In system 400, server 410 can be any suitable server or digital processing device for executing an application, such as, for example, a processor, a computer, a data processing device, or a combination of such devices. Communications network 406 can be various networks including the Internet, an intranet, a wide-area network (WAN), a local-area network (LAN), a wireless network, a frame relay network, an asynchronous transfer mode (ATM) network, a virtual private network (VPN), a mobile ad-hoc network (MANET), etc. or any combination of any of the same. Communications links 404 and 408 can be any communications links suitable for communicating data between clients 402 and server 410, such as network links, dial-up links, wireless links, hard-wired links, etc. Clients 402 can be any suitable digital processing devices, such as, for example, personal computers, laptop computers, mainframe computers, data displays, Internet browsers, personal digital assistants (PDAs), two-way pagers, wireless terminals, portable telephones, etc., or any combination of the same. In some embodiments, clients 402 and server 410 can be located within an organization. Alternatively, clients 402 and server 410 can be distributed between multiple organizations.

Figure 5:
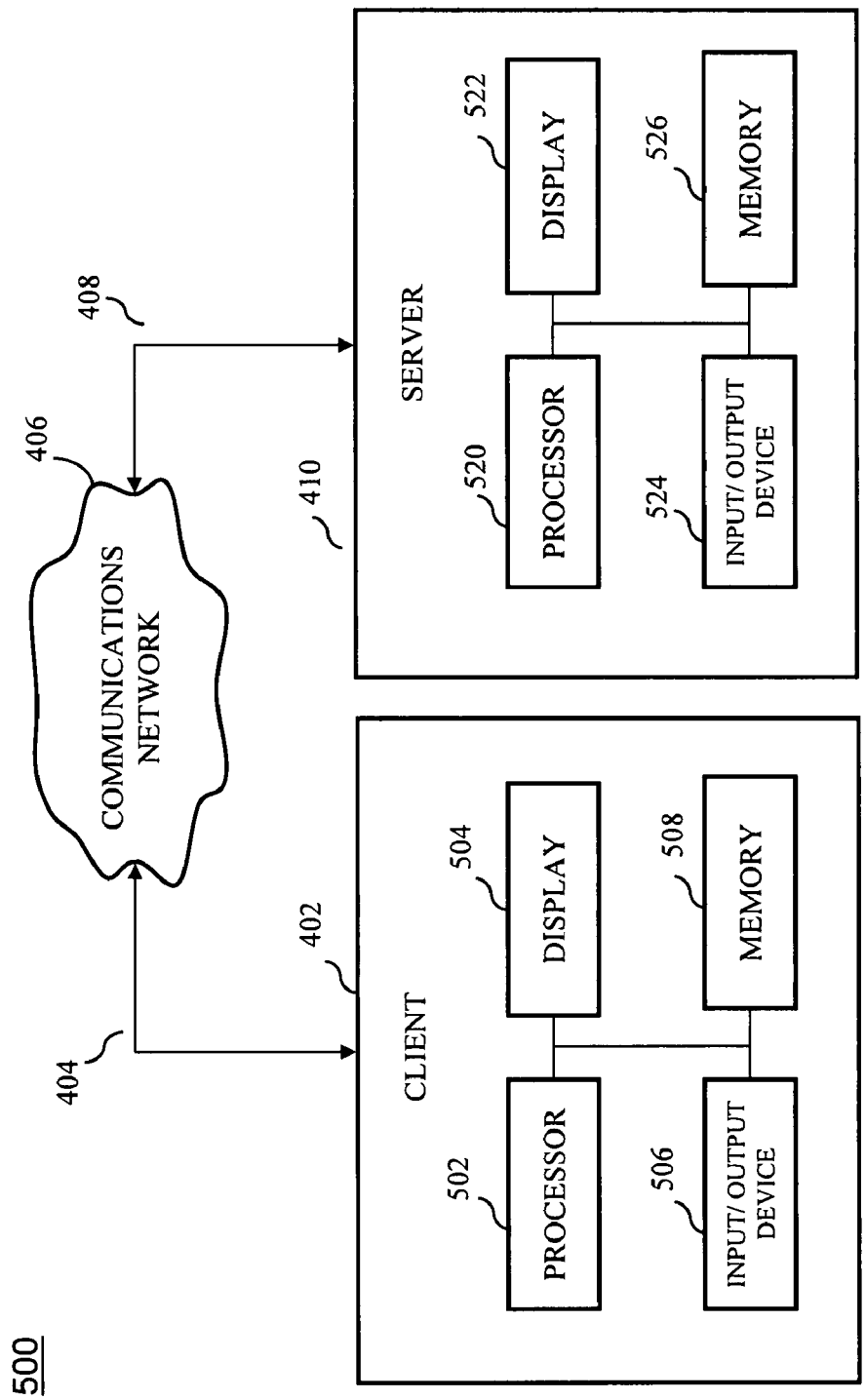
FIG. 5 is an illustration of nodes that can be used in FIG. 1 in accordance with some embodiments of the disclosed subject matter.

The server 410 and one of the clients 402, which are depicted in FIG. 4, are illustrated in more detail in FIG. 5. Referring to FIG. 5, client 402 and server 410 can include respectively, among other things, processors 502 and 520, displays 504 and 522, input/output devices 506 and 524, and memory 508 and 526, which can be interconnected. The input/output devices can receive input and send output such as, for example, text from keyboard, images from a camera, images from a scanner, audio recordings, voice-to-text translations, network traffic, packets, anomaly detection models, and/or training datasets, etc. In some embodiments, memory 508 and 526 contain a storage device for storing a program for controlling processors 502 and 520 and/or performing methods such as those illustrated in FIGS. 1-3. Variations and combinations of system 500 might be suitable for different embodiments of the disclosed subject matter. In addition, although some embodiments are described herein as being implemented on a client and/or a server, this is only illustrative. Various components of some embodiments of the disclosed subject matter can be implemented on any suitable platform.

Figure 6:
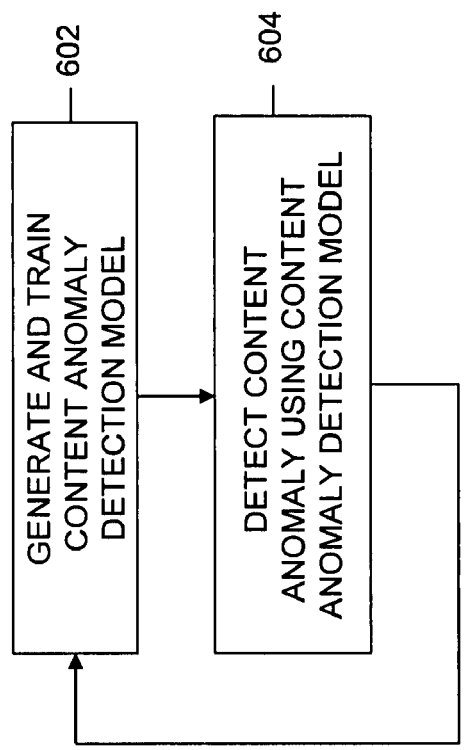
FIG. 6 is a simplified illustration of a method for generating a content anomaly detection model and detecting content anomalies in accordance with some embodiments of the disclosed subject matter.

The systems, methods, and media of the disclosed subject matter can be used in accordance with various anomaly detection systems and methods. For example, FIG. 6 is a simplified illustration of a method for generating an anomaly detection model and detecting content anomalies. As shown, at 602, a content anomaly detection model can be generated and trained. At 304, the content anomaly detection model can be used to detect anomalies. Various embodiments of the method of FIG. 6 are described in, for example International Application No. PCT/US2007/005408, which is hereby incorporated by reference herein in its entirety.

Figure 7:
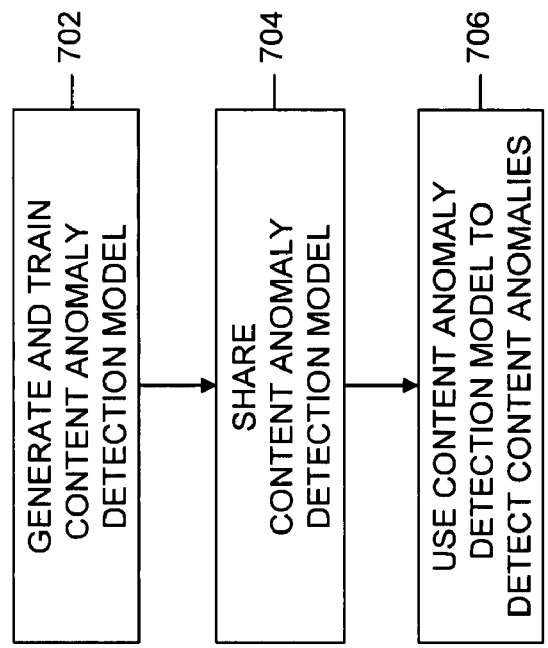
FIG. 7 is a simplified illustration of a method for generating, training, and sharing a binary-based content anomaly detection model and for using the content anomaly model to detect content anomalies in accordance with some embodiments of the disclosed subject matter.

Also, for example, FIG. 7 is a simplified illustration of methods for generating, training, and sharing a binary-based content anomaly model and for using the content anomaly model to detect content anomalies. As shown, at 702, a binary-based content anomaly detection model is generated and trained. At 704, the binary-based content anomaly detection is shared. A shared model can be received from one or more remote sites to compare with and update a local model. At 706, the binary based content anomaly detection model is used to detect content anomalies. For example, an anomaly score of an input dataset can be used to determine whether the input dataset is anomalous. Various embodiments of the method of FIG. 7 are described in, for example International Application No. PCT/US2007/005406, which is hereby incorporated by reference herein in its entirety. Other examples of systems and methods that can be used to detect anomalies and/or generate anomaly detection models, are described in, for example, International Application No. PCT/US2004/037654, International Application No. PCT/US2007/83003, and U.S. patent application Ser. No. 10/986,447, each of which is hereby incorporated by reference herein in its entirety.

In some embodiments, if a remote model indicates that a local training data item is abnormal and/or a local normal model contains abnormal content, further testing can be performed. For example, returning to FIGS. 1-3, in some embodiments, if a data item, series of data items, and/or or portion of a model is found to be abnormal at, for example, 140, 210 and/or 330, further evaluation can be performed. The further evaluation can include, for example, execution and/or processing of data items executed in a protected environment that can monitor and detect for abnormal behavior. If the execution in the protected environment determines that the data item or items are not abnormal, or are otherwise acceptable, then the indication of anomaly from remote models can be ignored. For example, instead of adding a data item determined to be abnormal, at 300, to abnormal data items 340, the data item, and possibly related data items (e.g., an entire function or other section of code associated with the data item), can be sent for additional testing in a protected environment. If this processing determines the data item is normal, it can be added to normal data items 350. Various systems and/or methods can be used to perform this additional testing, for example, the systems and/or methods of U.S. patent application Ser. No. 11/870,043, International Application No PCT/US2007/83003, and/or International Application No PCT/US2007/78773, each of which is hereby incorporated by reference herein in its entirety.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method, implemented on a processor, for generating sanitized data, comprising:
   dividing, using the processor, a first training dataset comprised of a plurality of training data items into a plurality of data subsets each including at least one training data item of the plurality of training data items of the first training dataset;
   based on the plurality of data subsets, generating, using the processor, a plurality of distinct anomaly detection micro-models;
   receiving, using, the processor, at least one additional anomaly detection micro-model that was shared by a remote device, wherein at least one of the plurality of micro-models are updated based at least in part on the at least one additional anomaly detection micro-model;
   testing, using the processor, at least one data item of a plurality of data items of a second training dataset of training data items against each of the plurality of micro-models to produce a score for the at least one tested data item; and
   generating, using the processor, at least one output dataset by removing one of the plurality of training data items from the second training dataset based on the score for the at least one tested data item.

2. The method of claim 1, wherein the generating at least one output dataset based on the score for the at least one tested data item comprises removing at least one data item of the plurality of data items from the input training dataset and wherein the method further comprises generating a sanitized anomaly detection model based on the at least one output dataset.

3. The method of claim 2, further comprising testing an input dataset using the sanitized anomaly detection model to determine if the input dataset includes anomalies.

4. The method of claim 1, wherein the second training dataset is the first training data set and wherein the testing comprises for each of the at least one tested data item scoring the at least one tested data item based on a number of micro-models of the plurality of micro-models which indicate that the current data item is abnormal.

5. The method of claim 4, wherein different weights are assigned to at least two micro-models of the plurality of micro-models and wherein the testing is further based on the different weights assigned to the at least two micro-models.

6. The method of claim 1, wherein the data items of the plurality of training data items comprise at least one of packets and program instructions.

7. The method of claim 1, wherein the plurality of micro-models includes one micro-model for each data subset of the plurality of data subsets.

8. The method of claim 1, wherein the at least one output dataset comprises a normal dataset and an abnormal dataset and wherein the method further comprises generating a normal anomaly detection model based on the normal dataset and generating an abnormal anomaly detection model based on the abnormal dataset.

9. A method, implemented on a processor, for generating sanitized data, comprising:
  dividing, using the processor, a first training dataset comprised of a plurality of training data items into a plurality of data subsets each including at least one training data item of the plurality of training data items of the first training dataset;
  based on the plurality of data subsets, generating, using the processor, a plurality of distinct anomaly detection micro-models;
  testing, using the processor, at least one data item of a plurality of data items of a second training dataset of training data items against each of the plurality of micro-models to produce a score for the at least one tested data item;
  determining, using the processor, whether at least one data item is abnormal based on the testing against at least one of the micro-models;
  executing, using the processor, any data item determined to be abnormal in a protected environment; and
  generating, using the processor, at least one output dataset based on the score for the at least one tested data item, wherein the generating at least one output dataset is further based on the executing any data item determined to be abnormal in the protected environment.

10. A non-transitory computer-readable medium containing computer-executable instructions that, when executed by a processor, cause the processor to perform a method for generating sanitized data, the method comprising:
  dividing a first training dataset comprised of a plurality of training data items into a plurality of data subsets each including at least one training data item of the plurality of training data items of the first training dataset;
  based on the plurality of data subsets, generating a plurality of distinct anomaly detection micro-models;
  receiving at least one additional anomaly detection micro-model that was shared by a remote device, wherein at least one of the plurality of micro-models are updated based at least in part on the at least one additional anomaly detection micro-model;
  testing at least one data item of a plurality of data items of a second training dataset of training data items against each of the plurality of micro-models to produce a score for the at least one tested data item; and
  generating at least one output dataset by removing one of the plurality of training data items from the second training dataset based on the score for the at least one tested data item.

11. The non-transitory computer-readable medium of claim 10, wherein the generating at least one output dataset based on the score for the at least one tested data item comprises removing at least one data item of the plurality of data items from the input training dataset and wherein the method further comprises generating a sanitized anomaly detection model based on the at least one output dataset.

12. The non-transitory computer-readable medium of claim 10, wherein the second training dataset is the first training data set and wherein the testing comprises for each of the at least one tested data item scoring the at least one tested data item based on a number of micro-models of the plurality of micro-models which indicate that the current data item is abnormal.

13. A system for generating sanitized data comprising:
  an interface in communication with a network;
  a memory; and
  a processor in communication with the memory and the interface;
  wherein the processor:
    divides a first training dataset comprised of a plurality of training, data items into a plurality of data subsets each including at least one training data item of the plurality of training data items of the first training dataset;
    based on the plurality of data subsets, generates a plurality of distinct anomaly detection micro-models;
    receives at least one additional anomaly detection micro-model that was shared by a remote device, wherein at least one of the plurality of micro-models are updated based at least in part on the at least one additional anomaly detection micro-model;
    tests at least one data item of the plurality of data items of a second training dataset of training data items against each of the plurality of micro-models to produce a score for the at least one tested data item; and
    generates at least one output dataset by removing one of the plurality of training data items from the second training dataset based on the score for the at least one tested data item.

14. The system of claim 13, wherein the generating at least one output dataset based on the score for the at least one tested data item comprises removing at least one data item of the plurality of data items from the input training dataset and wherein the processor further generates a sanitized anomaly detection model based on the at least one output dataset.

15. The system of claim 13, wherein the second training dataset is the first training data set and wherein the testing comprises for each of the at least one tested data item scoring the at least one tested data item based on a number of micro-models of the plurality of micro-models which indicate that the current data item is abnormal.

16. A non-transitory computer-readable medium containing computer-executable instructions that, when executed by a processor, cause the processor to perform a method for generating, sanitized data, the method comprising:
  dividing a first training dataset comprised of a plurality of training data items into a plurality of data subsets each including at least one training data item of the plurality of training data items of the first training dataset;
  based on the plurality of data subsets, generating a plurality of distinct anomaly detection micro-models;

testing at least one data item of a plurality of data items of a second training dataset of training data items against each of the plurality of micro-models to produce a score for the at least one tested data item;

determining whether at least one data item is abnormal based on the testing against at least one of the micro-models;

executing any data item determined to be abnormal in a protected environment; and generating at least one output dataset based on the score for the at least one tested data item, wherein the generating at least one output dataset is further based on the executing any data item determined to be abnormal in the protected environment.

17. A system for generating sanitized data comprising:

an interface in communication with a network;

a memory; and a processor in communication with the memory and the interface;

wherein the processor:

divides a first training dataset comprised of a plurality of training data items into a plurality of data subsets each including at least one training data item of the plurality of training data items of the first training dataset;

based on the plurality of data subsets, generates a plurality of distinct anomaly detection micro-models;

tests at least one data item of a plurality of data items of a second training dataset of training data items against each of the plurality of micro-models to produce a score for the at least one tested data item;

determines whether at least one data item is abnormal based on the testing against at least one of the micro-models;

executes any data item determined to be abnormal in a protected environment; and generates at least one output dataset based on the score for the at least one tested data item, wherein the generating at least one output dataset is further based on the executing any data item determined to be abnormal in the protected environment.

* * * * *

UNITED STATES PATENT AND TRADEMARK OFFICE
CERTIFICATE OF CORRECTION

PATENT NO. : 8,407,160 B2
APPLICATION NO. : 11/940790
DATED : March 26, 2013
INVENTOR(S) : Gabriela Cretu et al.

It is certified that error appears in the above-identified patent and that said Letters Patent is hereby corrected as shown below:

In the Claims

Column 8, line 42 (Claim 1, line 11) "receiving, using, the processor," should be --receiving, using the processor,--.
Column 10, line 27 (Claim 13, line 8) "training, data items" should be --training data items--.

Signed and Sealed this
Twenty-second Day of October, 2013

Teresa Stanek Rea
*Deputy Director of the United States Patent and Trademark Office*